United States Patent
Ma et al.

(10) Patent No.: US 7,706,426 B2
(45) Date of Patent: Apr. 27, 2010

(54) METHOD FOR ESTIMATING ONE OR MORE PARAMETERS OF A ULTRA WIDEBAND SIGNAL AND A RECEIVER SYSTEM FOR RECEIVING ULTRA WIDEBAND SIGNALS

(75) Inventors: Yugang Ma, Singapore Science Park II (SG); Jun Xu, Singapore Science Park II (SG); Xiaobing Sun, Singapore Science Park II (SG); Kanzo Okada, Singapore Science Park II (SG)

(73) Assignee: Sony Corporation, Tokyo (JP)

( * ) Notice: Subject to any disclaimer, the term of this patent is extended or adjusted under 35 U.S.C. 154(b) by 579 days.

(21) Appl. No.: 11/695,415

(22) Filed: Apr. 2, 2007

(65) Prior Publication Data

US 2007/0237213 A1    Oct. 11, 2007

(30) Foreign Application Priority Data

Apr. 11, 2006    (SG) .............................. 200602425-1

(51) Int. Cl.
*H04B 1/69* (2006.01)
*H04L 27/06* (2006.01)

(52) U.S. Cl. ...................................... 375/130; 375/340

(58) Field of Classification Search ................ 375/130, 375/145, 138, 219, 347, 340, 317, 343; 342/137, 342/194, 195; 370/349, 480
See application file for complete search history.

(56) References Cited

U.S. PATENT DOCUMENTS 7,505,516 B2 *    3/2009    Gargin ........................ 375/238

(Continued)

FOREIGN PATENT DOCUMENTS

JP    2003-189353    4/2003

(Continued)

OTHER PUBLICATIONS

Win et al., "Characterization of Ultra-Wide Bandwidth Wireless Indoor Channels: A Communication-Theoretic View," IEEE Journal on Selected Areas in Communication, vol. 20, No. 9, Dec. 2002, pp. 1613-1627.

(Continued)

*Primary Examiner*—Khai Tran
(74) *Attorney, Agent, or Firm*—K&L Gates LLP (57) ABSTRACT

A method for estimating one or more parameters of a ultra wideband signal and a receiver system for receiving ultra wideband signals is provided. The method for estimating one or more parameters of a signal in an ultra wide band system including estimating the parameter(s) for a first signal element in a received signal then removing this signal element from the signal to obtain a modified signal. The parameter(s) for a number of further signal elements are then estimated and these elements are removed from the modified signal to form a refined signal. The parameter(s) for the first signal element are re-estimated to re-define the first signal element based on the refined signal minus the signal element having the greatest amplitude. The parameter(s) for the signal element having the greatest amplitude are re-estimated to re-define this signal element. The steps are repeated to generate a refined estimate of the parameter(s) for the first signal element. There is also disclosed a receiver for performing the above steps.

13 Claims, 4 Drawing Sheets

U.S. PATENT DOCUMENTS

| | | | |
|---|---|---|---|
| 7,561,613 B2 * | 7/2009 | Giannakis et al. | 375/134 |
| 2004/0071199 A1 | 4/2004 | Boesel et al. | |
| 2004/0218688 A1 * | 11/2004 | Santhoff et al. | 375/295 |
| 2005/0175076 A1 | 8/2005 | Miller et al. | |

FOREIGN PATENT DOCUMENTS

| | | |
|---|---|---|
| JP | 2006-042337 | 2/2006 |

OTHER PUBLICATIONS

Wu et al., "Super Resolution time Delay Estimation via MODE-WRELEX," IEEE Transactions of Aerospace and Electronic Systems, vol. 35, No. 1, Jan. 1999, pp. 294-.

Li et al., "An Efficient Algorithum for time Delay Estimation," IEEE Transactions on Signal Processing, vol. 46, No. 8, Aug. 1998, pp. 2231-2235.

* cited by examiner

METHOD FOR ESTIMATING ONE OR MORE PARAMETERS OF A ULTRA WIDEBAND SIGNAL AND A RECEIVER SYSTEM FOR RECEIVING ULTRA WIDEBAND SIGNALS

CROSS REFERENCES TO RELATED APPLICATIONS

The present application claims priority to Singapore Patent Application No. SG200602425-1 filed in the Singaporean Patent Office on Apr. 11, 2006, the entire contents of which is being incorporated herein by reference.

BACKGROUND

The present application relates to a method for estimating one or more parameters of a signal in an ultra wideband system, and a receiver for receiving ultra wideband signals. In particular, the methods and receivers according to one or more preferred embodiments may have particular application in delay and amplitude estimation in pulse based ultra wideband (UWB) systems, such as positioning systems.

In positioning systems, a pulse based ultra wideband (UWB) signal may be used to estimate the distance of the transmitter from the receiver by estimating signal arrival time at the receiver. Such a signal may also be used to estimate the direction of arrival (DOA) of a signal at the receiver, by comparing the signal amplitudes received by two directional antennae which have been placed in a fixed geometrical relationship to one another. A conventional method for estimating the signal arrival time is by measuring the amplitude of the received signal and the time at which it exceeds a threshold value is taken as the signal arrival time. The maximum amplitude value of the received signal is taken to be the strength of the signal.

The above conventional method is satisfactory in a free space condition, that is one in which there are no reflections. However, in a system where there are multiple reflections in the signal path, the reflection signals will overlap with the direct path signal and this will affect the timing and the amplitude values determined by the above conventional method. The received signal will be the sum of the direct-path and multipath signals.

To increase the signal to noise ratio (SNR), the cross-correlation between the received signal and a local stored pulse template may be calculated. Based on the cross-correlation function, the signal arrival time and amplitude may be estimated. This is equivalent to a matched filter. Unfortunately, cross-correlation cannot solve the multipath problem described above.

In the publication by Jian Li, and Renbiao Wu entitled "An efficient algorithm for time delay estimation" and published in IEEE Transaction on Signal Processing. Vol. 46. No. 8, August 1998, for the multipath delay mixed signal, a frequency domain time delay estimation approach was presented. The approach was formulated as a nonlinear least squares (NLS) fitting problem and solved by the Weighted Fourier transform and RELAXation (hereinafter referred to as WRELAX) technique, where it was shown that the delay estimation for every multipath element of the mixed signal may approach Cramer-Rao bound (CRB) and hence is optimal.

The WRELAX technique was also disclosed in the publication by Renbiao Wu, Jian Li, Zheng-shi Liu, entitled "Super resolution time delay estimation via MODE_WRELAX." Published in IEEE Transaction Aerospace and Electronic Systems, Vol. 35, No. 1, January 1999, to achieve super resolution time-delay estimation.

When the dimensions of the signals (that is the number of multipath copies of the transmitted signal) are known, the WRELAX technique described in the publication by Jian Li, and Renbiao Wu entitled "An efficient algorithm for time delay estimation" and published in IEEE Transaction on Signal Processing. Vol. 46. No. 8, August 1998 performs satisfactorily. However, it becomes very time consuming when the number of multipaths is large, due to the multi-level iterations of the WRELAX technique, which makes operation in real-time difficult and complex.

Thus there is a need for an apparatus and method for calculating the amplitude and time of arrival of a signal from a multipath signal.

SUMMARY

The present application generally provides a method for estimating one or more parameters of a received UWB signal by inhibiting the effects of multipath interference to obtain an estimated value or values for the parameter or parameters.

According to a first aspect there is provided a method for estimating one or more parameters of a signal in an ultra wide band system comprising the steps of:

(a) digitizing a received signal to form a digitized signal;

(b) estimating one or more parameters for a first signal element in the digitized received signal to define the first signal element;

(c) removing the defined first signal element from the digitized received signal to obtain a modified signal;

(d) estimating the one or more parameters for a further signal element to define the further signal element;

(e) removing the defined further signal element from the modified signal;

(f) repeating the steps (d) and (e) for a predetermined number of signal elements;

(g) obtaining a refined signal comprising the digitized received signal minus the defined further signal elements with the exception of the signal element having the greatest amplitude of all of the predetermined number of signal elements;

(h) re-estimating the one or more parameters for the first signal element to re-define the first signal element based on the refined signal minus the signal element having the greatest amplitude of all of the predetermined number of signal elements;

(i) re-estimating the one or more parameters for the signal element having the greatest amplitude of all of the predetermined number of signal elements to re-define the signal element having the greatest amplitude based on the refined signal minus the re-defined first signal element;

(j) re-estimating the first signal element using the refined signal minus the re-defined signal element having the greatest amplitude;

(k) repeating the steps (h) to (j) for a predetermined number of times to generate a refined estimate of the one or more parameters for the first signal element.

Preferably, the one or more parameters include the amplitude of the signal element, and/or the delay, wherein delay includes the time from initiation of a sampling process to the time of occurrence of the maximum amplitude of the signal element.

In an embodiment, the steps are performed in a time domain and in another embodiment the steps are performed in a frequency domain. In the embodiment where the steps are performed in the frequency domain, the method preferably further comprises applying a Fourier transform process to the received signal after digitizing the signal and prior to performing steps (b) to (k) In a further preferred embodiment, the steps of estimating the one or more parameters for a signal element comprise estimating the amplitude of the signal element; the method further comprising determining the direction of arrival of the received signal at an antenna system, the antenna system comprising two or more directional antennae placed in a fixed geometrical relationship, the method further comprising comparing the signal amplitude of the received signal as determined at step (k) for a first antenna with the signal amplitude of the received signal as determined at step (k) for the second antenna.

Preferably, the steps of estimating the one or more parameters for a signal element comprise estimating the delay for the first signal element of the received signal, that is the time from initiation of a sampling process to the time of occurrence of the maximum amplitude of the first signal element, the method further comprising determining a distance between a transmitter arranged to transmit the signal received at a receiver to form the received signal on which steps (a) to (k) are performed, by estimating the time of arrival of the received signal using the delay as estimated in step (k).

According to a second aspect there is provided a transceiver comprising:
a transmitter;
a receiver; and
monitoring means for monitoring one or more parameters of an antenna associated with the transmitter to generate a predicted transfer function for the antenna;
further monitoring means for monitoring one or more parameters of an antenna associated with the receiver to generate a predicted transfer function for the antenna associated with the receiver;
the transmitter being arranged to transmit the predicted transfer function for the antenna associated with the transmitter through a data communication system to the receiver;
the receiver being arranged to perform the method steps (a) to (k) defined above in the method for estimating one or more parameters of a signal based on the received signal and using, in the step of estimating the one or more parameters for a signal element, the predicted transfer functions for the antennae associated with the transmitter and the receiver.

According to a third aspect there is provided a receiver arranged to estimate one or more parameters of a signal in an ultra wide band system, the receiver comprising:
(a) a digitizer for digitizing a received signal to form a digitized signal;
(b) a first estimation stage arranged to estimate one or more parameters for a first signal element in the digitized received signal to define the first signal element;
(c) a first subtraction stage arranged to remove the defined first signal element from the digitized received signal to obtain a modified signal;
(d) a second estimation stage arranged to estimate the one or more parameters for a further signal element to define the further signal element;
(e) a second subtraction stage arranged to remove the defined further signal element from the modified signal;
(f) the second estimation stage further being arranged to estimate the one or more parameters for a predetermined number of further signal elements to define the further signal elements, and the second subtraction stage being further arranged to remove the defined further signal elements from the modified signal;
(g) a refining stage arranged to obtain a refined signal comprising the digitized received signal minus the defined further signal elements with the exception of the signal element having the greatest amplitude of all of the predetermined number of signal elements;
(h) a first re-estimation stage arranged to re-estimate the one or more parameters for the first signal element to re-define the first signal element based on the refined signal minus the signal element having the greatest amplitude of all of the predetermined number of signal elements;
(i) a second re-estimation stage arranged to re-estimate the one or more parameters for the signal element having the greatest amplitude of all of the predetermined number of signal elements to re-define the signal element having the greatest amplitude based on the refined signal minus the re-defined first signal element;
(j) a third re-estimation stage arranged to re-estimate the first signal element using the refined signal minus the re-defined signal element having the greatest amplitude;
(k) the first, second and third re-estimation stages being arranged to repeat re-estimation steps for a predetermined number of times to generate a refined estimate of the one or more parameters for the first signal element.

Preferably, the first and second estimation stages are arranged to estimate the amplitude of the signal element, and/or the delay, wherein delay comprises the time from initiation of a sampling process to the time of occurrence of the maximum amplitude of the signal element.

In an embodiment, one or more of the stages are arranged to operate in a time domain.

In a further embodiment, wherein one or more of the stages are arranged to operate in a frequency domain, the receiver further comprising a processing stage arranged to apply a Fourier transform process to the received signal after digitizing the signal.

Preferably, the estimation stages are arranged to estimate the amplitude of the signal element(s), the receiver further comprising means for determining the direction of arrival of the received signal at an antenna system associated with the receiver, the antenna system comprising two or more directional antennae placed in a fixed geometrical relationship, the means for determining comprising a comparison stage to compare the refined estimate of the signal amplitude of the received signal as determined by the third re-estimation stage for a first antenna in the antenna system with the refined estimate of the signal amplitude of the received signal as determined by the third re-estimation stage for a second antenna in the antenna system.

According to a fourth aspect there is provided a transceiver system comprising a receiver according to that defined above, wherein the estimation stages are arranged to estimate the delay for the first signal element of the received signal, that is the time from initiation of a sampling process to the time of occurrence of the maximum amplitude of the first signal element, the system further comprising means for determining a distance between a transmitter arranged to transmit the signal received at the receiver to form the received signal, the means for determining being arranged to estimate the time of arrival of the received signal using the delay determined from the refined estimate of the delay by the third re-estimation stage.

According to an embodiment, more stable timing and amplitude estimation is enabled as compared with common conventional correlation methods as they are robust to multipath distortion and have the ability to suppress the effects of multipath interference. Furthermore, the conventional WRE-LAX NLS technique which is described in, for example, the publication by Jian Li, and Renbiao Wu entitled "An efficient algorithm for time delay estimation" and published in IEEE Transaction on Signal Processing. Vol. 46. No. 8, August 1998, involves multiple-level iteration method steps which renders the conventional method impractical for real-time implementation.

By contrast, in an embodiment, while the number of multipath signal elements may be large, the complexity of the method is reduced by dynamically detecting the dominating elements of the received signal and estimating the first several path signals using fewer iterations than the conventional WRELAX NLS technique and using one-dimensional iteration method steps. This is much simpler than conventional multiple-level iteration techniques thereby rendering one or more preferred embodiments suitable for real-time implementation.

In an embodiment, an UWB positioning system for amplitude may be used based on DOA estimation and ranging correction by suppressing multipath interference by extracting the first arrival pulse signal from a multipath mixed signal and estimating its amplitude and arrival time, and is particularly advantageous for both delay and amplitude estimation in pulse based UWB systems.

Additional features and advantages are described herein, and will be apparent from, the following Detailed Description and the figures.

BRIEF DESCRIPTION OF THE FIGURES

FIG. 1 (a) is a graph showing the variation in signal amplitude with time of a received UWB pulse signal in a free space condition.

FIG. 1 (b) is a graph showing the variation in signal amplitude with time of a received UWB pulse signal in a multipath system and shows the direct pulse signal and a reflection pulse signal.

FIG. 1 (c) is a graph showing the sum of the direct path and reflection pulse signals of FIG. 1 (b).

FIG. 3 (a) is a waveform of a received signal showing the direct signal and reflected signals in the time domain and a sampling system.

FIG. 3 (b) is a waveform of a received signal showing the direct signal and reflected signals in the frequency domain and a processing system.

DETAILED DESCRIPTION

Figure 1:
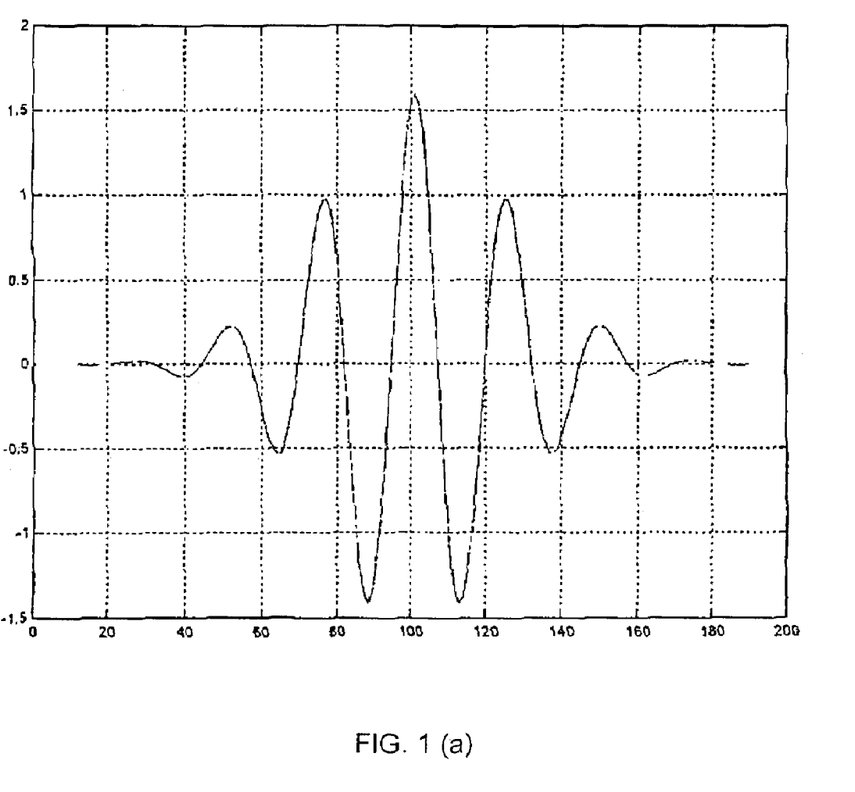

In a pulse based UWB system, a received UWB signal may be analyzed for both delay and amplitude estimation to assist in the determination of the distance and direction of the transmitter from the receiver. FIG. 1 (a) shows a waveform of a received UWB signal in a system operating in a free space environment, that is an environment where there are no multipath signals due to reflections. FIG. 1 (b) shows a waveform of a received UWB signal in a free space environment together with a signal coming via a reflection path. FIG. 1 (c) shows a waveform of the signal which would be received which comprises the sum of the two signals shown in FIG. 1 (b). It will be seen from a comparison of FIGS. 1 (a) and 1 (c) that the summed received signal reaches its peak value later than the free space signal. Moreover, the peak value is not the same for the two conditions. As a result, it will be seen that multipath reflections will affect the timing and amplitude estimations of the received signals.

Figure 2:
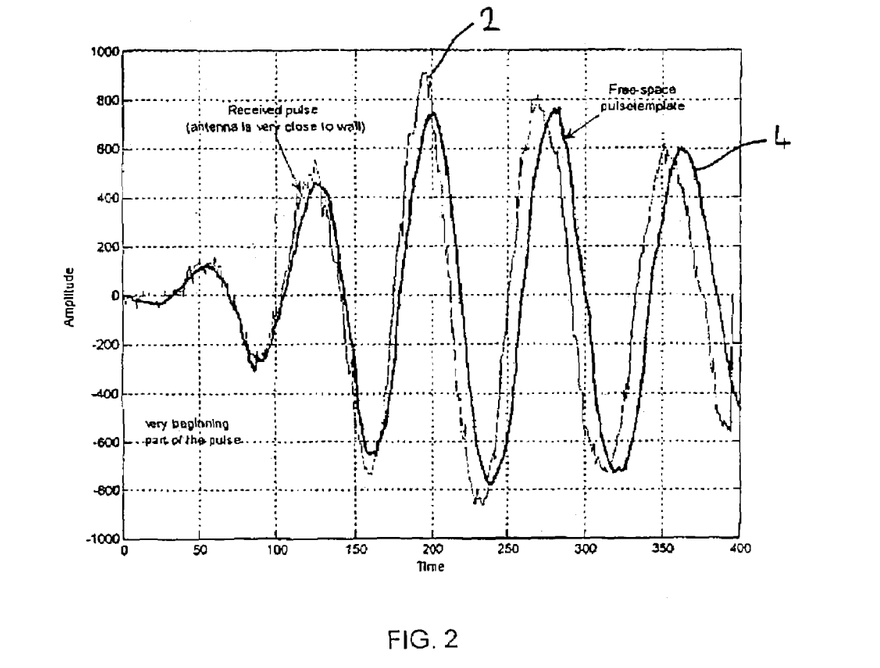
FIG. 2 is a graph showing the summed signal of FIG. 1 (c) superimposed over a graph showing the free space signal template for the same pulse.

FIG. 2 shows the waveform of a received signal 2 together with a template 4 corresponding to the free space signal. It will be seen that, initially, the two waveforms coincide. However, the amplitude of the signal is very small at this point and therefore the signal-to-noise (SNR) will be low which will adversely affect the reliability of any estimations of amplitude and arrival time of the received signals obtained from this part of the signal.

To obtain reliable estimations of the amplitude and arrival time, it is desirable to extract the direct path element from the combined waveform thereby suppressing the multipath effects. In a preferred embodiment of the invention, the received signal is processed using an iterative process to separate several path signals which may then be removed from the combined signal to obtain the direct path element. The arrival time and the amplitude estimations of the direct path may be obtained from the mixed waveform as the multipath effect is suppressed.

Figure 3:
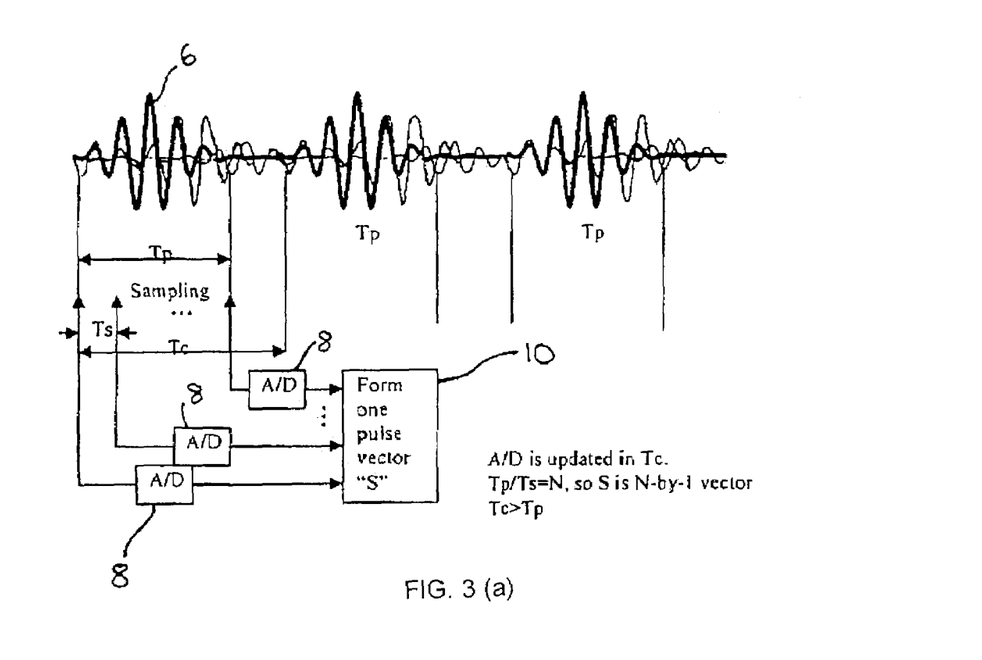

A method according to an embodiment is a multi-signal fitting approach. FIG. 3 (a) shows a waveform 6 and fitting circuit for use in the present invention. The waveform shows a sequence of received pulses together with the timings related to the sampling and the waveform, namely, the pulse duration, Tp, the period between samples Ts, and the time between the start of one pulse and the start of the next pulse Tc.

The sampling circuit is the processing system for extracting the direct pulse from the received signal in the time domain. Each sample obtained from the waveform is digitized in an A/D converter 8. The digital output from the A/D converter 8 is passed to the input of a processing stage 10 where it is processed to produce a single pulse signal vector S. The single pulse signal vector S is then processed in a further processing stage 11 to remove elements from the signal which relate to the multipath signals, to obtain the direct signal.

The first signal element (first path) will be based on the initial part of the received signal, however, as seen from FIG. 2, in this part of the signal there is a low signal amplitude and therefore a low signal to noise ratio However, according to one or more preferred embodiments of the present invention, the estimation of signal element amplitude and delay is not directly calculated in the low SNR area but instead the whole length of the signal is considered, with the other signal elements removed. This improves the SNR and therefore the estimation is more accurate.

The sampled received signal may be represented as $$S=[r_0 r_1 \ldots r_M]^T \tag{1}$$

where $r_i$ is the ith sampled value of the signal in the observation window, and one observation window includes M samples. Where the pulse sequence is periodic, the signal in the observation window may be time averaged over several periods. This averaging process may increase the signal to noise ratio (SNR).

As the received signal is discretely sampled along the time axis, as shown in FIG. 3 (a), the estimation in the time domain of the delay (which is the time from the start of sampling of the signal to the time at which the peak value of the signal occurs) is time discrete except that some interpolations may be applied. The advantage of the time domain approach is its low complexity.

Figure 3B:
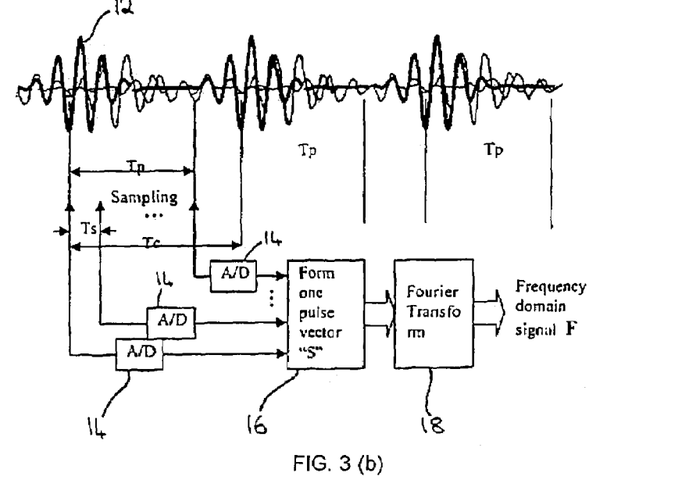

However, the method embodying the present invention may be carried out in either the time or the frequency domain. FIG. 3 (b) shows a waveform 12 and fitting circuit for use in the present invention in which the received sampled signal is transformed to the frequency domain. In this embodiment, each sample obtained from the waveform is digitized in an A/D converter 14. The digital output from the A/D converter 14 is applied to the input of a processing stage 16 where it is processed to produce a single pulse signal vector S. The single pulse signal vector S is then passed to a Fourier transform stage 18 where the signal is transformed to the frequency domain. The transformed signal F is then processed in a further processing stage 19 to remove elements from the signal which relate to the multipath signals, to obtain the direct signal.

In this embodiment, the delays correspond to continuous phase shifting. Based on the phase estimations, the continuous delays may be obtained. In the frequency domain the received signal may be denoted by $$F = [f_0 f_1 \ldots f_M]^T \qquad (2)$$

where F is the discrete Fourier transform of the time domain signal S.

Both the time and frequency domain procedures are described below.

In the time domain, $$A = [a_1 a_2 \ldots a_M]^T \qquad (3)$$

where A is the time domain template of the non-distorted pulse signal, and $[.]^T$ denotes the transpose of a matrix or vector. The delay version of A may be denoted by:

$$A(\tau) \neq A(nT_s) = [0 \ldots 0 a_1 a_2 \ldots a_{M-n}]^T \in R^{M \times 1} \qquad (4)$$

where $nT_s$ is the discrete approximate of delay $\tau$, $T_s$ is the sampling duration, and n is the integer closest to $\tau/T_s$.

To obtain a signal from which it is possible to estimate accurate values for the delay and amplitude of the direct signal, firstly it is necessary to calculate approximately the delays and amplitudes for signal elements 1 to N, where N is the number of signal elements. This may be achieved using conventional methods, such as that explained in the publication by Jian Li, and Renbiao Wu, entitled "An efficient algorithm for time delay estimation" published in IEEE Transaction on Signal Processing. Vol. 46. No. 8, August 1998, which is incorporated herein by reference.

A signal template, which is a pulse waveform obtained in a known environment before the parameter estimation, is known or may be obtained by learning through monitoring the antenna parameters. The information on the transmitter antenna waveform may be sent to the receiver through data communications for the receiver. In this way, the reception and parameter estimation may be optimized. However, in practical applications, rather than estimating the parameters, it may be possible to select large enough numbers.

Figure 4:
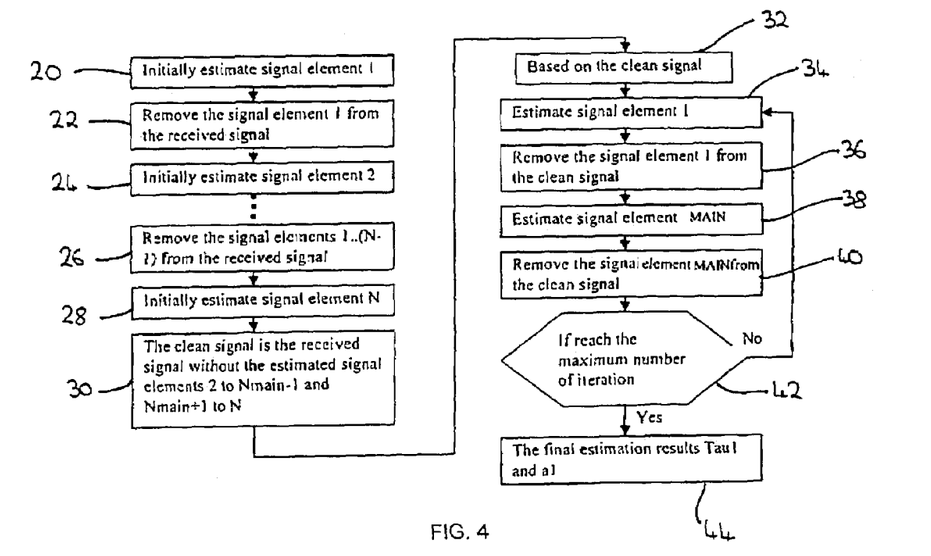
FIG. 4 is a flow chart of the process according to an embodiment.

FIG. 4 shows a flow diagram for the process of removing the multipath signals from a received signal to obtain a clean direct signal from which an estimation of the delay $\tau$ and amplitude a of the received signal may be obtained. The processing stages 10 and 16 of FIGS. 3(a) and 3(b) respectively may operate in accordance with the process illustrated in FIG. 4.

In a first stage 20, the delay $\tau$ and amplitude a of a first signal element $S_1$ (hereinafter referred to as signal element 1) is estimated as follows:

For signal element 1:

$$\begin{cases} \tau_1 = \underset{\tau}{\mathrm{argmax}} A(\tau)^H S \\ a_1 = \dfrac{A(\tau_1)^H S}{(A^H A)} \end{cases} \qquad (5)$$

where $[.]^H$ denotes the Hermitian transpose of a matrix or vector.

In a second stage 22, the signal element 1 is removed from the received signal. The received signal minus signal element 1 may be represented by $S_{-1}$ as follows:

$$S_{-1} = S - a_1 A(\tau_1) \qquad (6)$$

In a third stage 24, the delay and amplitude of a second signal element (hereinafter referred to as signal element 2) may be calculated as follows:

$$\begin{cases} \tau_2 = \underset{\tau}{\mathrm{argmax}} A(\tau)^H S_{-1} \\ a_2 = \dfrac{A(\tau_2)^H S_{-1}}{(A^H A)} \end{cases} \qquad (7)$$

In a fourth stage 26, the delay and amplitude of the remaining signal elements other than signal elements 1 and 2 may be calculated by:

$$S_{-12} = S_{-1} - a_2 A(\tau_2) \qquad (8)$$

The third signal element's parameters may be calculated as follows:

$$\begin{cases} \tau_3 = \underset{\tau}{\mathrm{argmax}} A(\tau)^H S_{-12} \\ a_3 = \dfrac{A(\tau_3)^H S_{-12}}{(A^H A)} \end{cases} \qquad (9)$$

The above process is repeated to obtain all of the initial delay and amplitude estimates for the signal elements 1 to N−1.

In a fifth stage 28, the initial delay and amplitude estimates for the signal element N are then calculated.

The amplitude of the signal element (hereinafter referred to as signal element MAIN) that has the maximum amplitude among signal elements 2 to N, may be denoted by $a_{main}$, and the corresponding delay may be denoted by $\tau_{main}$.

The signal element 1 and signal element MAIN are deemed to be the useful parts of the signal and the other signal elements are deemed to be the interference. The clean signal may be determined in a sixth stage 30 by:

$$S_c = S - \sum_{i=2, i \neq main}^{N} a_i A(\tau_i) \qquad (10)$$

The next step in the process is to correct iteratively the signal element 1 and the signal element MAIN based on $S_c$ as follows:

(1) $S_{c,-main} = S_c - a_{main} A(\tau_{main})$ (11)

The re-calculated delay and amplitude for signal element 1 may be determined in seventh and eighth stages 32, 34 from:

$$\begin{cases} \tau_1 = \underset{\tau}{\mathrm{argmax}} A(\tau)^H S_c^2 \\ a_1 = \dfrac{A(\tau_1)^H S_c}{(A^H A)} \end{cases} \qquad (12)$$

(2) In a ninth stage 36, the signal element 1 is removed from the clean signal:

$$S_{c,-1} = S_c - a_1 A(\tau_1) \quad (13)$$

The re-calculated delay and amplitude from signal element MAIN are determined in a tenth stage 38 from:

$$\begin{cases} \tau_{main} = \operatorname*{argmax}_{\tau} A(\tau)^H S_{c,-1} \\ a_{main} = \dfrac{A(\tau_{main})^H S_{c,-1}}{(A^H A)} \end{cases} \quad (14)$$

In an eleventh stage 40, the signal element Main is removed from the clean signal.

(3) In a twelfth stage 42, a check is made to determine if the process has reached the maximum number of iterations N. If the maximum number of iterations has not been reached, the process is repeated from the eighth stage 34 until the maximum number of iterations has been reached.

Once the maximum number of iterations has been reached, the final estimation results for signal element 1 are $\tau_1$, $a_1$.

In frequency domain, the process is very similar to that described above in respect of the time domain, the same basic stages 20 to 44 as those set out in FIG. 4 being applicable.

The frequency domain representation of the template A of the non-distorted pulse signal is given by:

$$X = [x_1 x_2 \ldots x_M]^T \quad (15)$$

and $$X(\tau) = \operatorname{diag}(e^{-\tau \cdot 0 \cdot 2\pi/(M-1)} e^{-\tau \cdot 1 \cdot 2\pi/(M-1)} \ldots e^{-\tau \cdot (M-1) \cdot 2\pi/(M-1)}) X = P(\tau) X \in C^{M \times 1} \quad (16)$$

is the delay version of X. The delay representation in frequency domain is the phase shifting, and it is continuous.

In the first stage 20, the delay and amplitude for the signal element 1 are approximately calculated as follows:

$$\begin{cases} \tau_1 = \operatorname*{argmax}_{\tau} |F^H P(\tau) X| \\ a_1 = \dfrac{F^H P(\tau) X}{X^H X} \end{cases} \quad (17)$$

In the second stage 22, the signal element 1 is then removed from the received signal, the signal minus signal element 1 being denoted by $F_{-1}$, where $$F_{-1} = F - a_1 P(\tau_1) X \quad (18)$$

In the third stage 24, the delay and amplitude of signal element 2 are estimated as follows:

$$\begin{cases} \tau_2 = \operatorname*{argmax}_{\tau} |F_{-1}^H P(\tau) X| \\ a_2 = \dfrac{F_{-1}^H P(\tau_2) X}{X^H X} \end{cases} \quad (19)$$

In the fourth stage 26, the delay and amplitude of the remaining signal elements other than signal elements 1 and 2 may be calculated by:

$$F_{-12} = F_{-1} - a_2 P(\tau_2) X \quad (20)$$

The third signal element's parameters may be calculated as follows:

$$\begin{cases} \tau_3 = \operatorname*{argmax}_{\tau} |F_{-12}^H P(\tau) X| \\ a_3 = \dfrac{F_{-12}^H P(\tau_3) X}{X^H X} \end{cases} \quad (21)$$

The above process is repeated to obtain all of the initial delay and amplitude estimates for the signal elements 1 to N−1.

In the fifth stage 28, the initial delay and amplitude estimates for the signal element N are then calculated.

As in the case of the time domain process, $a_{main}$ is used to denote the amplitude of the signal element that has the maximum amplitude among signal elements 2 to N, and $\tau_{main}$ denotes the corresponding delay. Signal element 1 and signal element MAIN are considered to be the useful parts of the signal, the other signal elements being considered to constitute the interference. The clean signal may be determined in the sixth stage 30 by:

$$F_c = F - \sum_{i=2, i \neq main}^{N} a_i P(\tau_i) X \quad (22)$$

The signal element 1 and signal element MAIN are iteratively calculated based on $F_c$, as follows:

$$F_{c,-main} = F_c - a_{main} P(\tau_{main}) X \quad (23)$$

Then, in the seventh and eighth stages, the delay and amplitude for signal element 1 are re-calculated.

$$\begin{cases} \tau_1 = \operatorname*{argmax}_{\tau} |F_c^H P(\tau) X| \\ a_1 = \dfrac{F_c^H P(\tau_{main}) X}{X^H X} \end{cases} \quad (24)$$

(1) In the ninth stage 36, the signal element 1 is removed from the clean signal:

$$F_{c,-1} = F_c - a_1 P(\tau_1) X \quad (25)$$

The delay and amplitude for signal element MAIN are then re-calculated in the tenth stage 38 as follows:

$$\begin{cases} \tau_{main} = \operatorname*{argmax}_{\tau} |F_{c,-1}^H P(\tau) X| \\ a_{main} = \dfrac{F_{c,-1}^H P(\tau_{main}) X}{X^H X} \end{cases} \quad (26)$$

(2) A check is then performed in the eleventh stage 40 to determine if the maximum number of iterations has been reached. If it is determined that the predetermined maximum number of iterations has not been reached, the process of the eighth to eleventh stages is repeated until the maximum number of iterations has been reached.

The final estimation results for signal element 1 are $\tau_1$, $a_1$.

In summary, one or more preferred embodiments of the present invention improve the stability and accuracy of DOA estimation in a UWB positioning system. The positioning accuracy is thereby improved. The low complexity of the methods embodying the invention make it suitable for the real-time implementation.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for estimating one or more parameters of a signal in an ultra wide band system comprising the steps of:
   (a) digitizing a received signal to form a digitized signal;
   (b) estimating one or more parameters for a first signal element in the digitized received signal to define the first signal element;
   (c) removing the defined first signal element from the digitized received signal to obtain a modified signal;
   (d) estimating the one or more parameters for a further signal element to define the further signal element;
   (e) removing the defined further signal element from the modified signal;
   (f) repeating the steps (d) and (e) for a predetermined number of signal elements;
   (g) obtaining a refined signal comprising the digitized received signal minus the defined further signal elements with the exception of the signal element having the greatest amplitude of all of the predetermined number of signal elements;
   (h) re-estimating the one or more parameters for the first signal element to re-define the first signal element based on the refined signal minus the signal element having the greatest amplitude of all of the predetermined number of signal elements;
   (i) re-estimating the one or more parameters for the signal element having the greatest amplitude of all of the predetermined number of signal elements to re-define the signal element having the greatest amplitude based on the refined signal minus the re-defined first signal element;
   (j) re-estimating the first signal element using the refined signal minus the re-defined signal element having the greatest amplitude;
   (k) repeating the steps (h) to (j) for a predetermined number of times to generate a refined estimate of the one or more parameters for the first signal element.

2. A method according to claim 1, wherein the steps of estimating the one or more parameters for a signal element, comprises estimating the amplitude of the signal element, and/or the delay, wherein delay comprises the time from initiation of a sampling process to the time of occurrence of the maximum amplitude of the signal element.

3. A method according to claim 1, wherein the steps are performed in a time domain.

4. A method according to claim 1, wherein the steps are performed in a frequency domain, the method further comprising applying a Fourier transform process to the received signal after digitizing the signal and prior to performing steps (b) to (k).

5. A method according to claim 1, wherein the steps of estimating the one or more parameters for a signal element comprise estimating the amplitude of the signal element; the method further comprising determining the direction of arrival of the received signal at an antenna system, the antenna system comprising two or more directional antennae placed in a fixed geometrical relationship, the method further comprising comparing the signal amplitude of the received signal as determined at step (k) for a first antenna with the signal amplitude of the received signal as determined at step (k) for the second antenna.

6. A method according to claim 1, wherein the steps of estimating the one or more parameters for a signal element comprise estimating the delay for the first signal element of the received signal, that is the time from initiation of a sampling process to the time of occurrence of the maximum amplitude of the first signal element, the method further comprising determining a distance between a transmitter arranged to transmit the signal received at a receiver to form the received signal on which steps (a) to (k) are performed, by estimating the time of arrival of the received signal using the delay as estimated in step (k).

7. A transceiver comprising:
   a transmitter;
   a receiver; and
   monitoring means for monitoring one or more parameters of an antenna associated with the transmitter to generate a predicted transfer function for the antenna;
   further monitoring means for monitoring one or more parameters of an antenna associated with the receiver to generate a predicted transfer function for the antenna associated with the receiver;
   the transmitter being arranged to transmit the predicted transfer function for the antenna associated with the transmitter through a data communication system to the receiver;
   the receiver being arranged to perform the method steps of claim 1 based on the received signal and using, in the step of estimating the one or more parameters for a signal element, the predicted transfer functions for the antennae associated with the transmitter and the receiver.

8. A receiver arranged to estimate one or more parameters of a signal in an ultra wide band system, the receiver comprising:
   (a) a digitizer for digitizing a received signal to form a digitized signal;
   (b) a first estimation stage arranged to estimate one or more parameters for a first signal element in the digitized received signal to define the first signal element;
   (c) a first subtraction stage arranged to remove the defined first signal element from the digitized received signal to obtain a modified signal;
   (d) a second estimation stage arranged to estimate the one or more parameters for a further signal element to define the further signal element;
   (e) a second subtraction stage arranged to remove the defined further signal element from the modified signal;
   (f) the second estimation stage further being arranged to estimate the one or more parameters for a predetermined number of further signal elements to define the further signal elements, and the second subtraction stage being further arranged to remove the defined further signal elements from the modified signal;
   (g) a refining stage arranged to obtain a refined signal comprising the digitized received signal minus the defined further signal elements with the exception of the signal element having the greatest amplitude of all of the predetermined number of signal elements;
   (h) a first re-estimation stage arranged to re-estimate the one or more parameters for the first signal element to re-define the first signal element based on the refined signal minus the signal element having the greatest amplitude of all of the predetermined number of signal elements;

(i) a second re-estimation stage arranged to re-estimate the one or more parameters for the signal element having the greatest amplitude of all of the predetermined number of signal elements to re-define the signal element having the greatest amplitude based on the refined signal minus the re-defined first signal element;

(j) a third re-estimation stage arranged to re-estimate the first signal element using the refined signal minus the re-defined signal element having the greatest amplitude;

(k) the first, second and third re-estimation stages being arranged to repeat re-estimation steps for a predetermined number of times to generate a refined estimate of the one or more parameters for the first signal element.

9. A receiver according to claim 8, wherein the first and second estimation stages are arranged to estimate the amplitude of the signal element, and/or the delay, wherein delay comprises the time from initiation of a sampling process to the time of occurrence of the maximum amplitude of the signal element.

10. A receiver according to claim 8, wherein one or more of the stages are arranged to operate in a time domain.

11. A receiver according to claim 8, wherein one or more of the stages are arranged to operate in a frequency domain, the receiver further comprising a processing stage arranged to apply a Fourier transform process to the received signal after digitizing the signal.

12. A receiver according to claim 8, wherein the estimation stages are arranged to estimate the amplitude of the signal element(s), the receiver further comprising means for determining the direction of arrival of the received signal at an antenna system associated with the receiver, the antenna system comprising two or more directional antennae placed in a fixed geometrical relationship, the means for determining comprising a comparison stage to compare the refined estimate of the signal amplitude of the received signal as determined by the third re-estimation stage for a first antenna in the antenna system with the refined estimate of the signal amplitude of the received signal as determined by the third re-estimation stage for a second antenna in the antenna system.

13. A transceiver system comprising a receiver according to claim 8, wherein the estimation stages are arranged to estimate the delay for the first signal element of the received signal, that is the time from initiation of a sampling process to the time of occurrence of the maximum amplitude of the first signal element, the system further comprising means for determining a distance between a transmitter arranged to transmit the signal received at the receiver to form the received signal, the means for determining being arranged to estimate the time of arrival of the received signal using the delay determined from the refined estimate of the delay by the third re-estimation.

* * * * *

UNITED STATES PATENT AND TRADEMARK OFFICE
CERTIFICATE OF CORRECTION

| | |
|---|---|
| PATENT NO. | : 7,706,426 B2 |
| APPLICATION NO. | : 11/695415 |
| DATED | : April 27, 2010 |
| INVENTOR(S) | : Yugang Ma et al. |

Page 1 of 1

It is certified that error appears in the above-identified patent and that said Letters Patent is hereby corrected as shown below:

Title Page, Item (75) Inventors:

Change Inventor, Jun Xu to "Jin Xu".

Signed and Sealed this

Thirtieth Day of November, 2010

David J. Kappos
*Director of the United States Patent and Trademark Office*